United States Patent
Wang et al.

(10) Patent No.: US 12,133,107 B2
(45) Date of Patent: Oct. 29, 2024

(54) METHOD, ELECTRONIC DEVICE AND COMPUTER PROGRAM PRODUCT FOR DATA TRANSMISSION

(71) Applicant: Dell Products L.P., Round Rock, TX (US)

(72) Inventors: Zijia Wang, WeiFang (CN); Jiacheng Ni, Shanghai (CN); Jinpeng Liu, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 435 days.

(21) Appl. No.: 17/747,193

(22) Filed: May 18, 2022

(65) Prior Publication Data

US 2023/0345289 A1    Oct. 26, 2023

(30) Foreign Application Priority Data

Apr. 22, 2022   (CN) .......................... 202210431001.6

(51) Int. Cl.
*H04W 28/02*     (2009.01)
*H04W 8/02*      (2009.01)

(52) U.S. Cl.
CPC ......... *H04W 28/0226* (2013.01); *H04W 8/02* (2013.01)

(58) Field of Classification Search
CPC .... H04W 28/0226; H04W 8/02; H04L 67/06; H04L 67/10; H04L 67/2842; G05B 19/406
See application file for complete search history.

(56) References Cited

U.S. PATENT DOCUMENTS

2017/0357537 A1*  12/2017  Tian ..................... G06F 3/0629

FOREIGN PATENT DOCUMENTS

CN       108540549 A  *  9/2018  ......... H04L 67/2842
WO    WO-2022052523 A1 *  3/2022  ........... G05B 19/406

OTHER PUBLICATIONS

3GPP, "3rd Generation Partnership Project; Technical Specification Group Services and System Aspects; System Architecture for the 5G System (5GS); Stage 2 (Release 16)," 3GPP TS 23.501 V16.5.0, Jul. 2020, 441 pages.

* cited by examiner

*Primary Examiner* — Vinncelas Louis
(74) *Attorney, Agent, or Firm* — Ryan, Mason & Lewis, LLP

(57) ABSTRACT

Embodiments of the disclosure provide a method, electronic device and computer program product for data transmission. The method may include enabling a management node to obtain status data of a plurality of work nodes from the plurality of work nodes managed by the management node in response to determining that a user terminal is to move from a first position to a second position different from the first position. The status data are at least associated with utilization rates of the plurality of work nodes. The method may further include determining a plurality of weights of the plurality of work nodes at least based on the status data of the plurality of work nodes. Moreover, the method may include loading content data requested by the user terminal to at least one work node in the plurality of work nodes based on the plurality of weights.

20 Claims, 5 Drawing Sheets

METHOD, ELECTRONIC DEVICE AND COMPUTER PROGRAM PRODUCT FOR DATA TRANSMISSION

RELATED APPLICATION(S)

The present application claims priority to Chinese Patent Application No. 202210431001.6, filed Apr. 22, 2022, and entitled "Method, Electronic Device and Computer Program Product for Data Transmission," which is incorporated by reference herein in its entirety.

FIELD

Embodiments of the disclosure relate to the field of communication, in particular to a method, electronic device and computer program product for data transmission.

BACKGROUND

In a 5G network, a service session can be captured by a user plane function (UPF) module and can be connected to a target data network through a session anchor to achieve service continuity. Therefore, the geographical locations of edge nodes are of great importance for providing finer service and shorter service delays. In order to adapt to this change, because network demands are common, the traditional service model needs remodeling to adapt to the trend. It should be understood that mobile service usually requires a shorter delay and can respond to roadside traffic conditions. Even though, at the front end, the computing workload can be assigned to the edge node closest to the user terminal, at the back end, the network IO and distributed system may still cause a delay, which may offset the advantage of the shorter delay brought by the edge node.

SUMMARY

Embodiments of the disclosure provide a solution for data transmission.

In a first aspect of the disclosure, a method for data transmission is provided. The method may include enabling a management node to obtain status data of a plurality of work nodes from the plurality of work nodes managed by the management node in response to determining that a user terminal is to move from a first position to a second position different from the first position. The status data are at least associated with utilization rates of the plurality of work nodes. The method may further include determining a plurality of weights of the plurality of work nodes at least based on the status data of the plurality of work nodes. In addition, the method may include loading content data requested by the user terminal to at least one work node in the plurality of work nodes based on the plurality of weights.

In a second aspect of the disclosure, an electronic device is provided, including: a processor; and a memory coupled to the processor and having an instruction stored therein, wherein the instruction, when executed by the processor, causes the electronic device to execute actions, and the actions include: enabling a management node to obtain status data of a plurality of work nodes from the plurality of work nodes managed by the management node in response to determining that a user terminal is to move from a first position to a second position different from the first position, wherein the status data are at least associated with utilization rates of the plurality of work nodes; determining a plurality of weights of the plurality of work nodes at least based on the status data of the plurality of work nodes; and loading content data requested by the user terminal to at least one work node in the plurality of work nodes based on the plurality of weights.

In a third aspect of the disclosure, a computer program product is provided. The computer program product is tangibly stored on a non-transitory computer-readable medium and includes machine-executable instructions, and the machine-executable instructions, when executed by a machine, cause the machine to execute any one of steps of the method according to the first aspect.

This Summary is provided to introduce the selection of concepts in a simplified form, which will be further described in the Detailed Description below. The Summary is neither intended to identify key features or main features of the disclosure, nor intended to limit the scope of the disclosure.

BRIEF DESCRIPTION OF THE DRAWINGS

Example embodiments of the disclosure are described in more detail herein with reference to the accompanying drawings, from which the above and other objectives, features, and advantages of the disclosure will become more apparent, and identical or similar reference numbers generally represent identical or similar components in the example embodiments of the disclosure. In the drawings.

DETAILED DESCRIPTION

Figure 1:
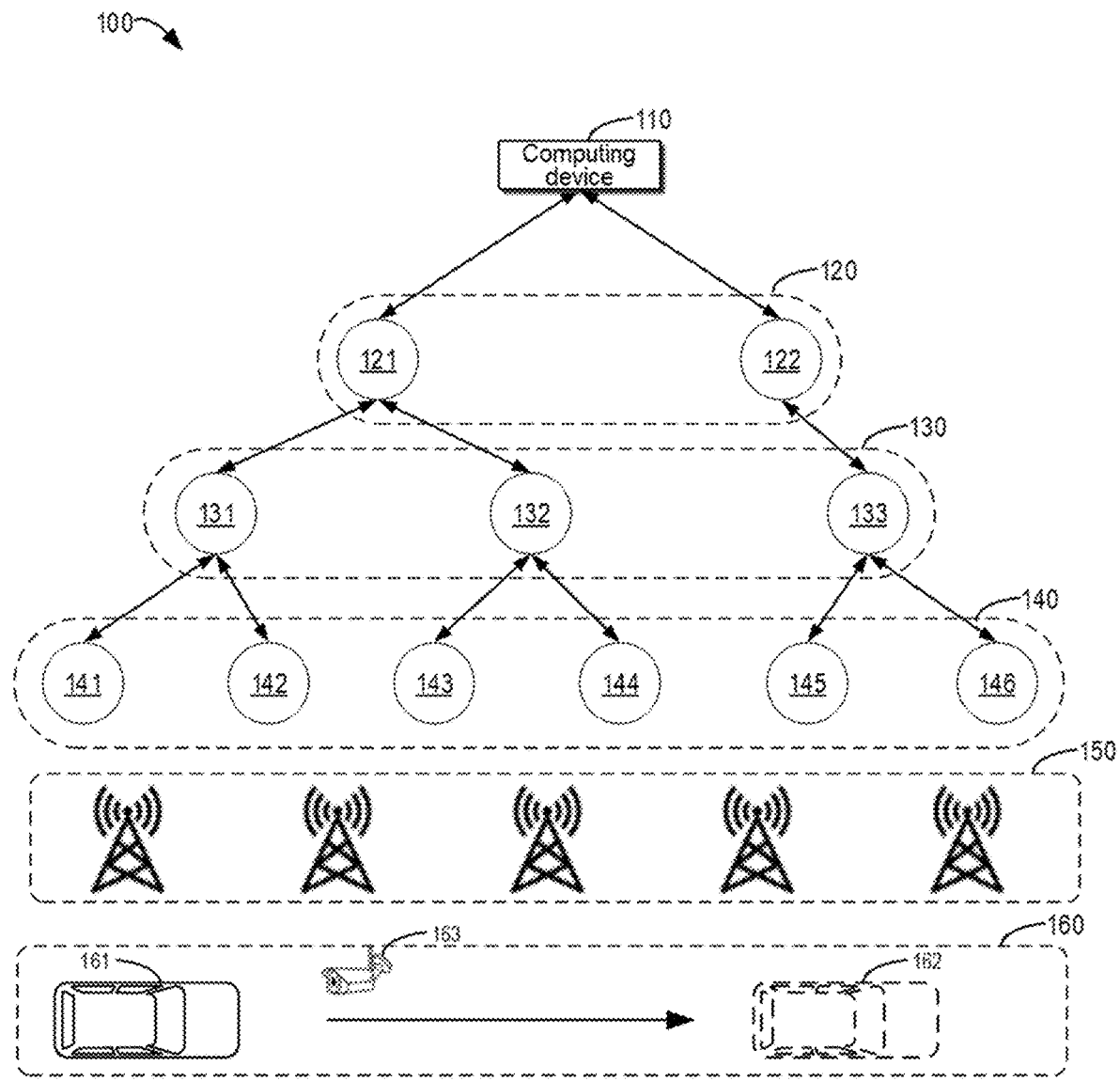
FIG. 1 shows a schematic diagram of an example environment according to an embodiment of the disclosure.

Principles of the disclosure will be described below with reference to several example embodiments illustrated in the drawings.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "a group of example embodiments." The term "another embodiment" indicates "a group of other embodiments." The terms "first," "second" and the like may refer to different or identical objects. Other explicit and implicit definitions may also be included below.

Continuing with the above discussion, in the process of achieving edge node calculations in a 5G network environment, the following problems usually occur.

First of all, a traditional content delivery network aims to cache data content requested by the user to an edge node closest to a user. The user is usually regarded as a wired network user, such as a user watching a video stream, or a user downloading game files from the Internet. This type of service is mainly designed to meet the network demands of the above-noted users. However, in a mobile service scenario, when a user downloads data content from a content source server, a session of the communication is anchored at an edge node near the geographical location of the user, while the user may be far away from the location at the same time. This continues to increase the transmission distance, which increases the delay and may degrade communication quality.

Secondly, the content delivery network usually selects a cloud platform or an Internet data center as a place where the data content is placed. However, such cloud platforms or Internet data centers are not specifically designed for mobile service scenarios. Even on the "edge" of the content network, the edge node may be far from the geographical location of the user. In short, the user cannot choose the next optimal content source server according to his own updated geographical location. In addition, when the user's movement is fast (for example, the user is in a fast-moving car), it is difficult to assemble the data content in the form of a data packet or a data block and then respond to the user request in a short time. Accordingly, in a mobile service scenario, even if the user's geographical location is captured by a communication system, the content data received by a user terminal may still come from a content source server that is not related to the user's geographical location.

In addition, in a mobile service scenario, due to the fast movement of the user, the session anchor of the user terminal may jump between a plurality of edge nodes. Mobile service may be affected by, for example, roadside time captured by back-end service. As mentioned above, a traditional content delivery network does not care about frequent geographical location changes, making it less flexible in the allocation of resources supporting mobile service.

In order to address, at least in part, the above disadvantages, an embodiment of the disclosure provides a novel solution for data transmission. This solution can determine an edge node with good performance in all aspects for the user terminal, and load the data content requested by the user and to be received by the user terminal to the edge node in advance, for receipt by the user terminal. In other words, as the user moves from one position to another, this solution can choose an edge node based on the status of each edge node, which is dedicated to providing the user with the data content needed to move to the other position. As a result, when the user terminal is moved sharply or rapidly, the data content requested by the user terminal can be loaded to one or more edge nodes on its travel path in advance, so that there will be no lagging to which the user is sensitive, caused by a long network delay or waiting for reconnection, and user experience can be remarkably improved.

FIG. 1 shows a schematic diagram of example environment 100 according to an embodiment of the disclosure. In example environment 100, a device and/or a process according to an embodiment of the disclosure may be implemented. As shown in FIG. 1, example environment 100 may include computing device 110, first-level management nodes 121 and 122 (usually collectively referred to as "first-level management nodes 120" below), second-level management nodes 131, 132 and 133 (usually collectively referred to as "second-level management nodes 130" below), work nodes 141, 142, 143, 144, 145 and 146 (usually collectively referred to as "work nodes 140" below), one or more base stations 150, and road surface environment 160.

In FIG. 1, computing device 110 is configured to manage first-level management nodes 121 and 122. Specifically, computing device 110 may learn information of lower-level nodes received by first-level management nodes 121 and 122 from first-level management nodes 121 and 122 by sending an instruction to first-level management nodes 121 and 122. Similarly, as shown in FIG. 1, first-level management node 121 is configured to manage second-level management nodes 131 and 132, first-level management node 122 is configured to manage second-level management node 133, second-level management node 131 is configured to manage work nodes 141 and 142, second-level management node 132 is configured to manage work nodes 143 and 144, and second-level management node 133 is configured to manage work nodes 145 and 146.

It should be understood that first-level management nodes 120 and second-level management nodes 130 may also be same-level management nodes, or there may be more levels of management relationships among first-level management nodes 120 or second-level management nodes 130. By establishing the above-described management architecture, a work node at an edge may be provided with a nearby management node, so the delay of the communication link is reduced.

Further, as shown in FIG. 1, work nodes 140 function as edge nodes, which can communicate with the one or more base stations 150, so as to realize data transmission to the user terminal. In FIG. 1, the user terminal may be vehicle 161. In road surface environment 160, vehicle 161 travels in the direction of the arrow and can be expected to appear at position 162. Roadside device 163, illustratively comprising a camera, may be configured to obtain the travel information of vehicle 161, and the obtained travel information is uploaded to work nodes 140 adjacent to the vehicle in real time or regularly. It should be understood that multiple instances of roadside device 163 can be arranged at predetermined intervals along a traffic route or track, so that the travel information of each vehicle traveling on the road surface can be comprehensively obtained.

Finally, the road surface environment information obtained by roadside device 163, edge environment information obtained by work nodes 140, and management environment information obtained by each management node can be reported to computing device 110 level by level, computing device 110 assesses the performance of each node relative to vehicle 161 and the next position 162 at which vehicle 161 will appear, and one or more work nodes that the content data requested by the user can be loaded onto are eventually determined. Of course, a computing device can also be arranged at a management node, so that the performance of lower-level nodes managed by the management node can be evaluated by the management node.

In some embodiments, vehicle 161 as the user terminal can also be replaced by other mobile communication devices of the user, such as a laptop, a notebook computer, a netbook computer, a tablet computer, a mobile phone and the like. Further, roadside device 163 need not comprise a camera and can instead be replaced by other types of roadside devices, for example, a traffic indicator light and the like.

In some embodiments, computing device 110 may be any device with computing capability. As a non-limiting example, the computing device may be any type of fixed computing device, mobile computing device, or portable computing device, including but not limited to a desktop computer, a laptop computer, a notebook computer, a netbook computer, a tablet computer and the like. All or part of the components of the computing device may be distributed in the cloud. The computing device and the nodes connected thereto may also adopt a cloud-edge architecture.

In some embodiments, first-level management nodes 120 and second-level management nodes 130 may be service nodes for controlling operation granularity of a geographic location level and an edge network level.

In some embodiments, work nodes 140 may be different levels of work nodes. As an example, work nodes 140 may be divided into two levels of work nodes. For example, first-level work nodes may be used to process a user terminal request whose delay is shorter than a threshold delay. In other words, first-level work nodes may be used to process a performance-sensitive service having a demand for a short delay, such as video data transmission, online games, etc. In addition, work nodes 140 may further include second-level work nodes, which can be used to process a user terminal request whose delay is longer than or equal to the threshold delay. In other words, second-level work nodes can be used to process a performance-insensitive service having no demand for short delay, such as file downloads.

In some embodiments, work nodes 140 may include caches used to store content data requested by a user. These caches may be replaced by various other types of devices with a storage function, including but not limited to a hard disk drive (HDD), a solid state drive (SSD), a removable disk, any other magnetic storage device and any other optical storage device, or any combination thereof.

Figure 2:
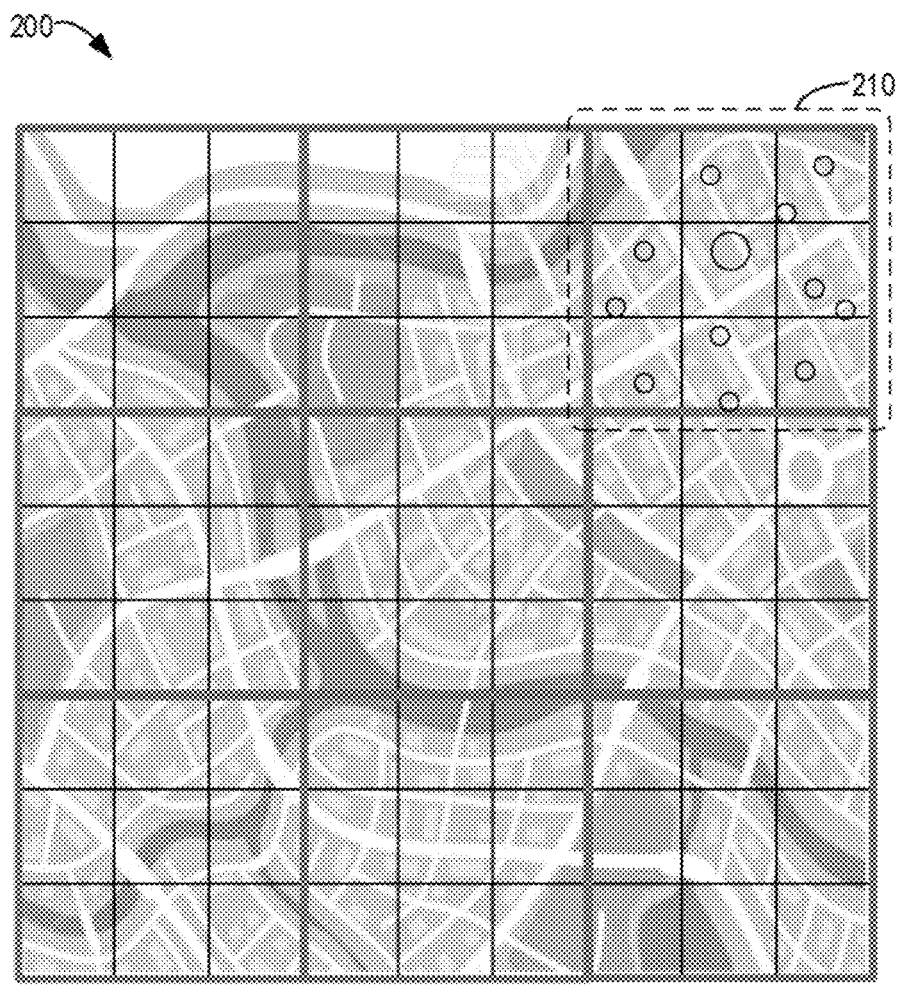
FIG. 2 shows a schematic diagram of a layout of a work node or an edge node in a geographical region according to an embodiment of the disclosure.

The following will describe a specific layout of work nodes 140 in detail with reference to FIG. 2. FIG. 2 shows a schematic diagram of layout 200 of work nodes or edge nodes in a geographical region according to an embodiment of the disclosure. As shown in FIG. 2, an example of a part of an electronic map is included in layout 200, and this part of the electronic map is divided into a plurality of regions through blocks. As an example, the upper right corner of FIG. 2 includes a plurality of regions 210 divided by a plurality of blocks. It should be understood that the plurality of regions 210 can be regarded as a larger region demarcated by a larger block, or can be regarded as smaller regions demarcated by nine smaller blocks. Considering the density of users or other factors in each region, a plurality of work nodes can be arranged in each region. These work nodes can be represented by the circles "o" in FIG. 2. As mentioned above, the work nodes can be divided into two levels of work nodes. For example, there are the first-level work nodes used to process user terminal requests whose delay is shorter than a threshold delay, and the second-level work nodes used to process user terminal requests whose delay is longer than or equal to the threshold delay.

As shown in FIG. 2, smaller circles can be used to represent the first-level work nodes, and larger circles can be used to represent the second-level work nodes. The first-level work nodes are usually uniformly arranged in regions where users appear, and have a sufficiently large number. Therefore, there is usually a work node close to the user terminal among the first-level work nodes, so the delay problem caused by a too long signal transmission distance is alleviated. Correspondingly, there is usually only one second-level work node arranged in a large region, so the distance between user equipment and second-level work nodes is usually longer. Even though second-level work nodes have a delay problem relative to the user terminal, second-level work nodes are usually set to transmit a strong signal, so a second-level work node, even if far from the user terminal, can still provide the user with the performance-insensitive service such as file downloads. First-level work nodes coordinate with second-level work nodes to provide service to users in a plurality of regions 210.

It should be understood that the sizes of the smaller regions and the larger region shown in FIG. 2 may be determined by computing device 110. In other words, based on the control of computing device 110, the work node in a smaller region or in a larger region can provide data transmission services for user terminals in different smaller regions or larger regions. Accordingly, FIG. 2 only aims to show some concepts of the disclosure, not to limit the scope of the disclosure.

A process for data transmission according to an embodiment of the disclosure will be described in detail below with reference to FIG. 3. For ease of understanding, the specific data mentioned in the following description are all illustrative and are not intended to limit the protection scope of the disclosure. It should be understood that the embodiment described below may also include additional actions not shown and/or may omit actions shown, and the scope of the disclosure is not limited in this regard.

Figure 3:
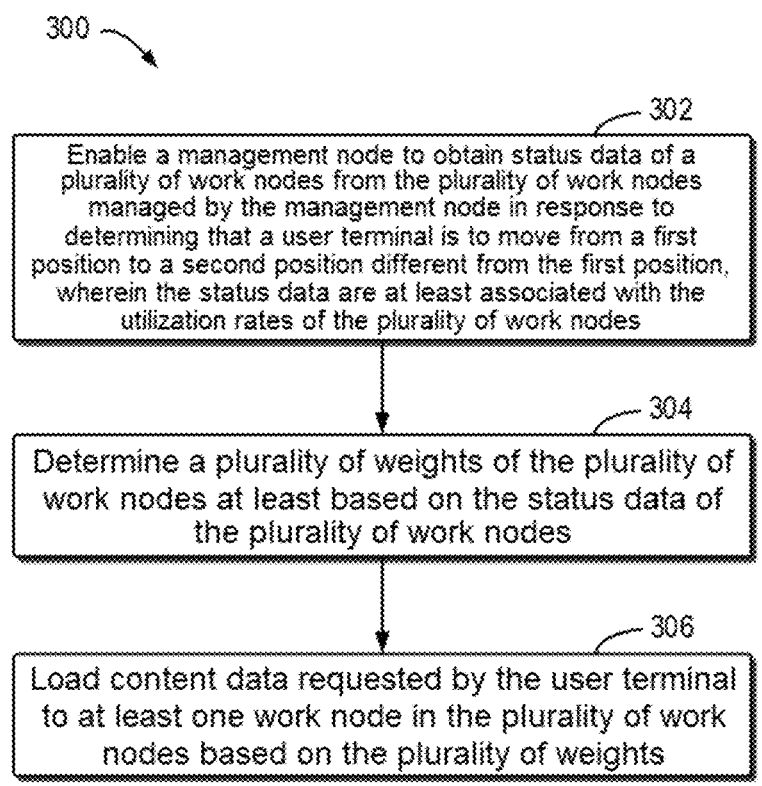
FIG. 3 shows a flow chart of a process for data transmission according to an embodiment of the disclosure.

FIG. 3 shows a flow chart of process 300 for data transmission according to an embodiment of the disclosure. In some embodiments, process 300 may be implemented in the computing device 110 in FIG. 1. Process 300 for data transmission according to an embodiment of the disclosure is now described with reference to FIG. 3. For ease of understanding, specific examples mentioned in the following description are all illustrative and are not used to limit the protection scope of the disclosure.

As shown in FIG. 3, in 302, computing device 110 may first determine the movement mode or movement path of the user terminal. As an example, computing device 110 may determine the location of the user terminal after a predetermined time passes based on the result of path planning of a navigation application. According to the location, computing device 110 may send an instruction to the management node so as to enable the management node to obtain from the plurality of work nodes managed by the management node the status data of these work nodes. It should be understood that the status data are at least related to utilization rates of these work nodes. As an example, a roadside device detecting the above user terminal can upload the number of all user terminals detected by the roadside device within a period of time in order to determine whether a work node connected to the roadside device is idle. If the status of the work node is idle, the status data score of the work node is high. Correspondingly, if the status of the work node is busy, the status data score of the work node is low. As a result, computing device 110 can determine a relatively idle work node from among the work nodes adjacent to the user equipment.

In some embodiments, these work nodes may be separate edge nodes adjacent to the roadside device.

In some embodiments, these work nodes may include a first group of work nodes, configured to process a user terminal request whose delay is shorter than the threshold delay, that is, performance-sensitive service. In addition, these work nodes may also include a second group of work nodes, configured to process a user terminal request whose delay is longer than or equal to the threshold delay, that is, performance-insensitive service.

In some embodiments, the utilization rates of these work nodes may be associated with the number of mobile terminals which are communicatively connected to a base station or the roadside device.

In some embodiments, as shown in FIG. 1, management nodes may include first-level management nodes 120 and second-level management nodes 130 managed by the first-level management nodes 120. In this arrangement, in order to instruct the management nodes to obtain status data from the work nodes, computing device 110 may transmit an indication to first-level management nodes 120 to enable first-level management nodes 120 to obtain the status data of work nodes 140 managed by the second-level management nodes 130 from second-level management nodes 130 and upload the status data of work nodes 140, status data of second-level management nodes 130, and their own status data to computing device 110. Accordingly, computing device 110 can determine a communication link for the next location of the user terminal based on the obtained status data, and the communication link contains the corresponding first-level management node (such as first-level management node 121), the corresponding second-level management node (such as second-level management node 132), and corresponding work node (such as work node 144).

It should be understood that if the communication link for the next position of the user terminal only needs to be adjusted on the level of second-level management nodes 130, computing device 110 only needs to instruct second-level management nodes 130 to obtain the status data of work nodes 140 managed by the second-level management nodes 130 and upload the status data of work nodes 140 and their own status data to computing device 110. In this way, computing device 110 can adjust the communication link on the level of second-level management nodes 130 based on the obtained status data.

Afterwards, in 304, computing device 110 can determine the corresponding weights of these work nodes at least based on the status data of the above plurality of work nodes. It should be understood that the status data can also be associated with the delay of these work nodes relative to the user terminal in the next position.

In some embodiments, the process of determining weights based on status data may be implemented by determining the weight of each of these work nodes based on the above delays and the above utilization rates. It should be understood that in addition to the factors of delay and utilization rate, weights or scores may be determined based on other necessary factors. For example, the performance of the work nodes may be considered. As an example, it is also possible to determine the weight of each of the work nodes in each current level by using a machine learning model or a deep learning model that is pre-trained by historical data or metadata.

In 306, computing device 110 can load the content data requested by the user terminal to at least one of these work nodes based on the above plurality of weights.

In some embodiments, computing device 110 can first compare the plurality of weights to determine at least one work node whose weight is higher than a threshold weight. For example, a threshold weight can be determined in advance, and the plurality of weights described above are compared with the threshold weight one by one, so as to find the work nodes whose weights are higher than the threshold weight. Next, the management node can be instructed to update one or more tasks of the at least one work node. As an example, the management node can maintain a task list for each work node managed by the management node, so when the work node for loading the content data changes, the management node needs to update the task list. After that, a content source node such as a content server may be instructed to send the content data to at least one work node. In this way, one or more work nodes loaded with the content data may be prepared for the user terminal, so that when the user changes their driving route, a persistent connection is still guaranteed.

Alternatively or additionally, computing device 110 may also compare the above plurality of weights to determine the work node with the highest weight. For example, computing device 110 may compare these weights to determine the highest weight. Furthermore, the management node may be instructed to update the tasks of the work node with the highest weight. After that, the content source node such as the content server may be instructed to send the content data to the work node. In this way, the work node with the highest score can be selected for the user terminal to be loaded with the data content requested by the user.

Figure 4:
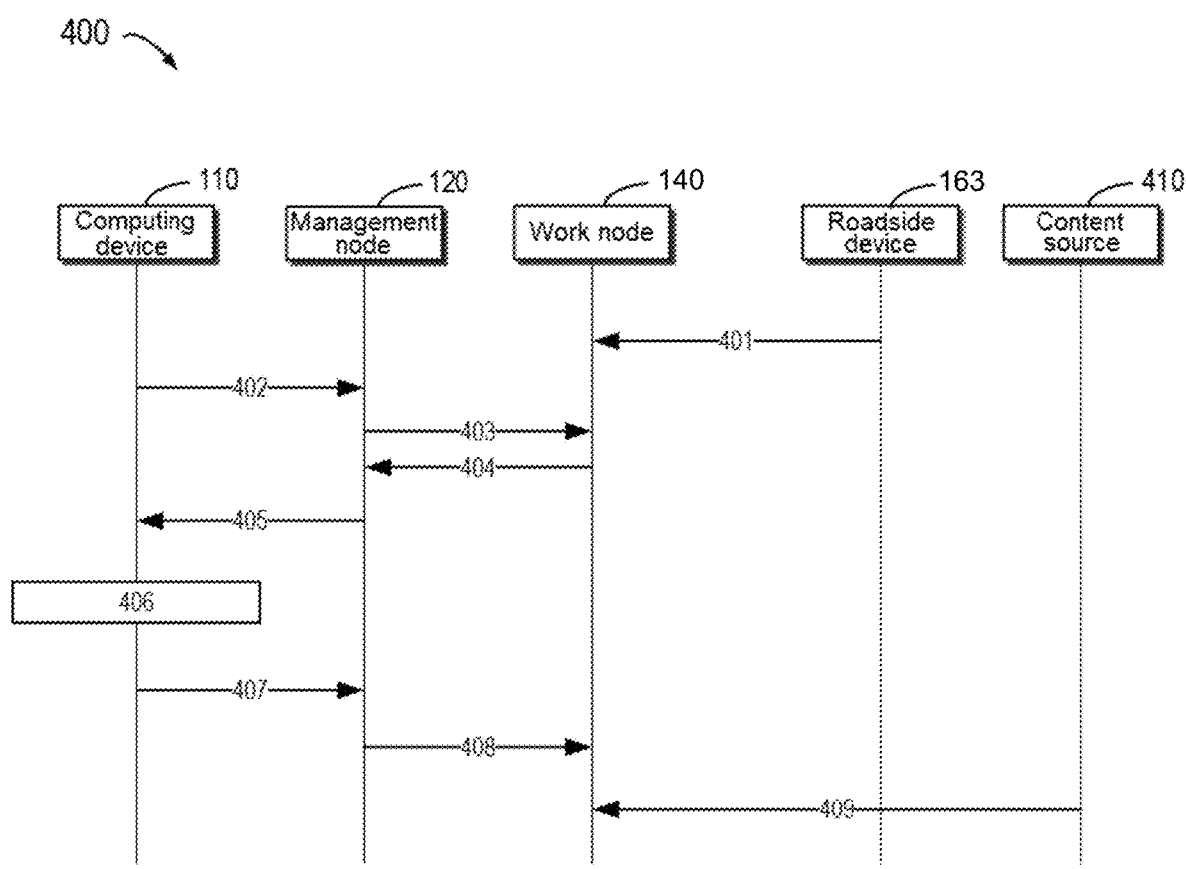
FIG. 4 shows a high-level pipeline diagram of a process for data transmission according to an embodiment of the disclosure.

In order to more clearly present the main ideas of the disclosure, FIG. 4 shows a high-level pipeline diagram of process 400 for data transmission according to an embodiment of the disclosure.

As shown in FIG. 4, process 400 for data transmission mainly involves multi-party information interaction among computing device 110, management node 120, work node 140, roadside device 163 and content source 410. It should be understood that FIG. 4 is only an example, and more management nodes, work nodes, roadside devices, etc. may be included. The management node 120 is illustratively a first-level management node.

In FIG. 4, process 400 for data transmission usually starts from computing device 110. Of course, before the operation of computing device 110 starts, roadside device 163 can report the environmental information of the user terminals detected by the roadside device in real time or regularly. Specifically, roadside device 163 can upload (401) the environmental information to work node 140, work node 140 then uploads the received environmental information and its own environmental information to management node 120, and management node 120 will then upload the received environmental information of roadside device 163, environmental information of work node 140 and its own environmental information to computing device 110. The specific details will not be repeated here.

As shown in FIG. 4, when computing device 110 detects that the moving user terminal has a corresponding data content request, it launches (402) execution of controlling a data transmission path to management node 120. It should be understood that the instruction may also include preset granularity information for transmission path control, which is used to represent the size of the block region in FIG. 2. As a result, management node 120 instructs (403) work node 140 to collect the environmental data of the roadside devices managed by the work node and its own environmental data. When the data collection is completed, work node 140 uploads (404) the collected data to management node 120, and management node 120 uploads (405) the received data and its own environmental data to computing device 110. After receiving the above data, computing device 110 computes (406) a score for each work node or even for each management node based on the data and determines the work node with the highest score or a data transmission path related to the work node, and transmits (407) information identifying the determined work node or the determined data transmission path to management node 120. From here, management node 120 transmits (408) information identifying the determined work node or the determined data transmission path to corresponding work node 140, and the content source is instructed to (409) load the data content requested by the user terminal to corresponding work node 140.

By the above embodiment, the disclosure creates a 5G-based data transmission framework. In this framework, the computing device can be set independently or set at the management node of a given level, so that one or more edge nodes with the best performance can be selected for the next position of the user terminal specific to the level where the computing device is located, so persistent communication connection is achieved, the lagging phenomena caused by the communication delay or reconnection is avoided, and the user experience is improved.

Figure 5:
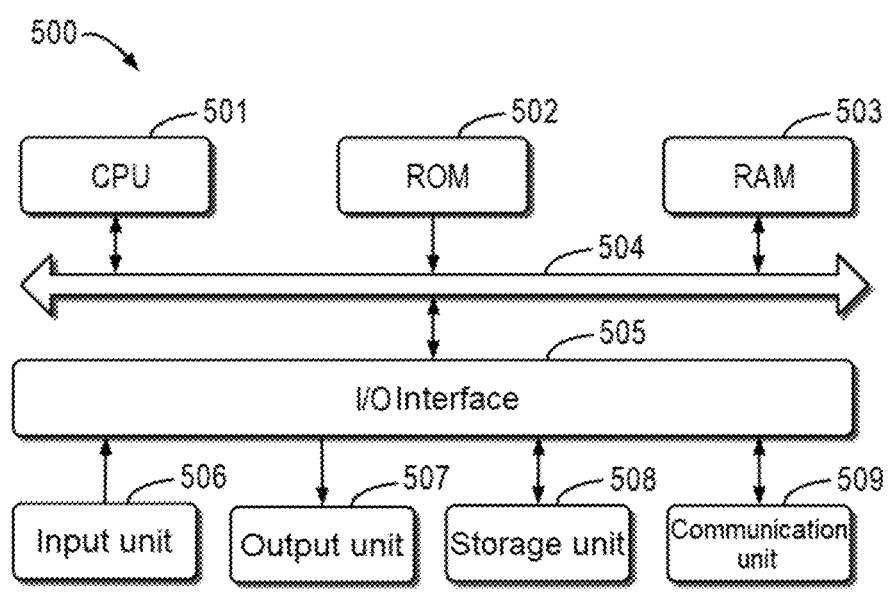
FIG. 5 shows a block diagram of an example electronic device that may be used to implement embodiments of the disclosure.

FIG. 5 shows a block diagram of example electronic device 500 that may be used to implement embodiments of the disclosure. For example, electronic device 500 can be used to implement computing device 110 shown in FIG. 1. As shown in the figure, electronic device 500 includes central processing unit (CPU) 501 that can execute various appropriate actions and processing according to computer program instructions stored in read-only memory (ROM) 502 or computer program instructions loaded from storage unit 508 to random access memory (RAM) 503. Various programs and data needed for the operation of electronic device 500 may also be stored in RAM 503. CPU 501, ROM 502, and RAM 503 are connected to each other through bus 504. Input/output (I/O) interface 505 is also connected to bus 504.

A plurality of components in electronic device 500 are connected to I/O interface 505, including: input unit 506, such as a keyboard or a mouse; output unit 507, such as various types of displays and speakers; storage unit 508, such as a magnetic disk or an optical disc; and communication unit 509, such as a network card, a modem, or a wireless communication transceiver. Communication unit 509 allows electronic device 500 to exchange information/data with other devices via a computer network, such as the Internet, and/or various telecommunication networks.

CPU 501 performs the various methods and processing described above, such as process 300. For example, in some embodiments, the various methods and processing described above may be implemented as computer software programs or computer program products, which are tangibly included in a machine-readable medium, such as storage unit 508. In some embodiments, part of or all the computer program may be loaded and/or installed to electronic device 500 via ROM 502 and/or communication unit 509. When the computer program is loaded into RAM 503 and executed by CPU 501, one or more steps of any process described above may be implemented. Alternatively, in other embodiments, CPU 501 may be configured in any other suitable manner (for example, by means of firmware) to execute a process such as process 300.

Example embodiments of the disclosure include a method, an apparatus, a system, and/or a computer program product. The computer program product may include a computer-readable storage medium on which computer-readable program instructions for executing various aspects of the disclosure are loaded.

The computer-readable storage medium may be a tangible device that may retain and store instructions used by an instruction-executing device. For example, the computer-readable storage medium may be but is not limited to, for example, an electrical storage device, a magnetic storage device, an optical storage device, an electromagnetic storage device, a semiconductor storage device, any non-transitory storage device, or any appropriate combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the above. The computer-readable storage medium used herein is not to be construed as transient signals per se, such as radio waves or other freely propagating electromagnetic waves, electromagnetic waves propagated through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the disclosure may be assembly instructions, instruction set architecture (ISA) instructions, machine instructions, machine-dependent instructions, microcode, firmware instructions, status setting data, or source code or object code written in any combination of one or more programming languages, wherein these programming languages include object-oriented programming languages such as Smalltalk and C++, and conventional procedural programming languages such as the "C" language or similar programming languages. The computer-readable program instructions may be executed entirely on a user computer, partly on a user computer, as a stand-alone software package, partly on a user computer and partly on a remote computer, or entirely on a remote computer or a server. When a remote computer is involved, the remote computer may be connected to a user computer through any type of network, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing the status information of computer-readable program instructions. The electronic circuit may execute the computer-readable program instructions to implement various aspects of the disclosure.

Various aspects of the disclosure are described herein with reference to flow charts and/or block diagrams of the method, the apparatus (system), and the computer program product according to the embodiments of the disclosure. It should be understood that each block of the flow charts and/or the block diagrams and combinations of blocks in the flow charts and/or the block diagrams may be implemented by computer-readable program instructions.

These computer-readable program instructions may be provided to the processing unit of a general-purpose computer, a special-purpose computer, or other programmable data processing apparatuses, so as to produce a machine, such that these instructions, when executed by the processing unit of the computer or the other programmable data processing apparatus, produce an apparatus for implementing functions/actions specified in one or more blocks in the flow charts and/or block diagrams. These computer-readable program instructions may also be stored in a computer-readable storage medium, and these instructions enable a computer, a programmable data processing apparatus, and/or other devices to work in a specific manner; and thus the computer-readable medium having instructions stored in it includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the system, method, and computer program product according to the various embodiments of the disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in a sequence different from the sequence marked in the drawings. For example, two successive blocks may actually be executed basically in parallel, and sometimes they may also be executed in a reverse order, which depends on the functions involved. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Various implementations of the disclosure have been described above. The foregoing description is illustrative rather than exhaustive, and is not limited to the disclosed implementations. Numerous modifications and alterations will be apparent to persons of ordinary skill in the art without departing from the scope and spirit of the illustrated implementations. The selection of terms used herein is intended to best explain the principles and practical applications of the implementations or the improvements to technologies on the market, so as to enable persons of ordinary skill in the art to understand the implementations disclosed herein.

What is claimed is:

1. A method for data transmission, comprising:
    enabling a management node to obtain status data of a plurality of work nodes from the plurality of work nodes managed by the management node in response to determining that a user terminal is to move from a first position to a second position different from the first position, wherein the status data are at least associated with respective utilization rates of the plurality of work nodes;
    determining a plurality of weights of the plurality of work nodes at least based on the status data of the plurality of work nodes;
    comparing the plurality of weights to identify at least one work node having a weight that satisfies one or more criteria relative to other ones of the weights of respective other ones of the work nodes; and
    loading content data requested by the user terminal in advance to the at least one work node in the plurality of work nodes as identified based on the plurality of weights.

2. The method according to claim 1, wherein the management node comprises a first management node and a second management node managed by the first management node, and enabling the management node to obtain the status data from the plurality of work nodes comprises:
    obtaining, by the second management node, the status data of the plurality of work nodes from the plurality of work nodes managed by the second management node; and
    obtaining, by the first management node, the status data from the second management node.

3. The method according to claim 1, wherein the status data are also associated with respective delays of the plurality of work nodes relative to the user terminal in the second position, and determining the weights at least based on the status data comprises:
    determining a weight of each work node in the plurality of work nodes based on the delay of that work node and the utilization rate of that work node.

4. The method according to claim 1, wherein the utilization rates of the plurality of work nodes are associated with the number of mobile terminals which are communicatively connected to a base station or a roadside device, and the base station or the roadside device is communicatively connected to the plurality of work nodes.

5. The method according to claim 1, wherein comparing the plurality of weights and loading the content data to the at least one work node as identified based on the plurality of weights comprises:
    comparing the plurality of weights to determine the at least one work node whose weight is higher than a threshold weight;
    enabling the management node to update one or more tasks of the at least one work node; and
    enabling a content source node to send the content data to the at least one work node.

6. The method according to claim 1, wherein comparing the plurality of weights and loading the content data to the at least one work node as identified based on the plurality of weights comprises:
    comparing the plurality of weights to determine the work node with the highest weight;
    enabling the management node to update one or more tasks of the work node; and
    enabling a content source node to send the content data to the work node.

7. The method according to claim 1, wherein the plurality of work nodes comprise separate edge nodes adjacent to a roadside device.

8. The method according to claim 1, wherein the plurality of work nodes comprise:
    a first group of work nodes, configured to process a user terminal request whose delay is shorter than a threshold delay; and
    a second group of work nodes, configured to process a user terminal request whose delay is longer than or equal to the threshold delay.

9. An electronic device, comprising:
    at least one processor; and
    a memory, coupled to the at least one processor and having instructions stored therein, wherein the instructions, when executed by the at least one processor, cause the electronic device to execute actions, and the actions comprise:

enabling a management node to obtain status data of a plurality of work nodes from the plurality of work nodes managed by the management node in response to determining that a user terminal is to move from a first position to a second position different from the first position, wherein the status data are at least associated with respective utilization rates of the plurality of work nodes;

determining a plurality of weights of the plurality of work nodes at least based on the status data of the plurality of work nodes;

comparing the plurality of weights to identify at least one work node having a weight that satisfies one or more criteria relative to other ones of the weights of respective other ones of the work nodes; and loading content data requested by the user terminal in advance to the at least one work node in the plurality of work nodes as identified based on the plurality of weights.

10. The electronic device according to claim 9, wherein the management node comprises a first management node and a second management node managed by the first management node, and enabling the management node to obtain the status data from the plurality of work nodes comprises:

obtaining, by the second management node, the status data of the plurality of work nodes from the plurality of work nodes managed by the second management node; and obtaining, by the first management node, the status data from the second management node.

11. The electronic device according to claim 9, wherein the status data are also associated with respective delays of the plurality of work nodes relative to the user terminal in the second position, and determining the weights at least based on the status data comprises:

determining a weight of each work node in the plurality of work nodes based on the delay of that work node and the utilization rate of that work node.

12. The electronic device according to claim 9, wherein the utilization rates of the plurality of work nodes are associated with the number of mobile terminals which are communicatively connected to a base station or a roadside device, and the base station or the roadside device is communicatively connected to the plurality of work nodes.

13. The electronic device according to claim 9, wherein comparing the plurality of weights and loading the content data to the at least one work node as identified based on the plurality of weights comprises:

comparing the plurality of weights to determine the at least one work node whose weight is higher than a threshold weight;

enabling the management node to update one or more tasks of the at least one work node; and enabling a content source node to send the content data to the at least one work node.

14. The electronic device according to claim 9, wherein comparing the plurality of weights and loading the content data to the at least one work node as identified based on the plurality of weights comprises:

comparing the plurality of weights to determine the work node with the highest weight;

enabling the management node to update one or more tasks of the work node; and enabling a content source node to send the content data to the work node.

15. The electronic device according to claim 9, wherein the plurality of work nodes comprise separate edge nodes adjacent to a roadside device.

16. The electronic device according to claim 9, wherein the plurality of work nodes comprise:

a first group of work nodes, configured to process a user terminal request whose delay is shorter than a threshold delay; and a second group of work nodes, configured to process a user terminal request whose delay is longer than or equal to the threshold delay.

17. A computer program product, tangibly stored on a non-transitory computer-readable storage medium and comprising machine-executable instructions, wherein the machine-executable instructions, when executed by a machine, cause the machine to execute actions comprising:

enabling a management node to obtain status data of a plurality of work nodes from the plurality of work nodes managed by the management node in response to determining that a user terminal is to move from a first position to a second position different from the first position, wherein the status data are at least associated with respective utilization rates of the plurality of work nodes;

determining a plurality of weights of the plurality of work nodes at least based on the status data of the plurality of work nodes;

comparing the plurality of weights to identify at least one work node having a weight that satisfies one or more criteria relative to other ones of the weights of respective other ones of the work nodes; and loading content data requested by the user terminal in advance to the at least one work node in the plurality of work nodes as identified based on the plurality of weights.

18. The computer program product according to claim 17, wherein the management node comprises a first management node and a second management node managed by the first management node, and enabling the management node to obtain the status data from the plurality of work nodes comprises:

obtaining, by the second management node, the status data of the plurality of work nodes from the plurality of work nodes managed by the second management node; and obtaining, by the first management node, the status data from the second management node.

19. The computer program product according to claim 17, wherein the status data are also associated with respective delays of the plurality of work nodes relative to the user terminal in the second position, and determining the weights at least based on the status data comprises:

determining a weight of each work node in the plurality of work nodes based on the delay of that work node and the utilization rate of that work node.

20. The computer program product according to claim 17, wherein the utilization rates of the plurality of work nodes are associated with the number of mobile terminals which are communicatively connected to a base station or a roadside device, and the base station or the roadside device is communicatively connected to the plurality of work nodes.

* * * * *